Nov. 3, 1964 R. W. ULMER 3,155,781

SERVICE OBSERVING EQUIPMENT

Filed Oct. 24, 1961 2 Sheets-Sheet 1

INVENTOR
R. W. ULMER
BY
R. C. Winter
ATTORNEY

INVENTOR
R. W. ULMER
BY
R. C. Winter
ATTORNEY 3,155,781

SERVICE OBSERVING EQUIPMENT

Robert W. Ulmer, Pearl River, N.Y., assignor to Bell Telephone Laboratories, Incorporated, New York, N.Y., a corporation of New York Filed Oct. 24, 1961, Ser. No. 147,282
16 Claims. (Cl. 179—175.2)

This invention relates generally to communication systems and relates particularly to such systems employing equipment which is used for observing the quality of service furnished by an operator at a switchboard. The invention further relates to equipment which prevents an operator from identifying when such observations are made and which minimizes the transmission losses over switchboard circuits that are due to service observing.

The service given by an operator in a communication system, such as a telephone system, is customarily observed at periodic intervals to obtain the basic service data which aids in determining the need for operator education programs, more equipment or preventative maintenance to improve service and simplify the tasks of operators.

To obtain the data required for these purposes, it is usually necessary to have long cable conductors connected between service observing equipment and a circuit used by the operator for rendering service. These cable conductors are used for transmitting electrical signals from the observed operator circuit to the observing equipment to indicate the character of the operator service.

Impedance unbalances in the observed circuit are generally caused by the so-called bridge capacitance of the long cable conductors. As a result, the transmission over the observed circuit is often seriously impaired and high level noise signals are frequently present in that circuit. These noise signals may be readily detected by the operator with a device, such as a telephone, while the circuit is not in use for rendering service, and thus they make it possible for her to identify that the circuit is under observation. After making such an identification, the operator often either attempts to perform her assigned tasks with increased speed and accuracy; or, if other circuits are available for rendering the service, she refrains from using the observed circuit whenever possible to avoid having the observing equipment detect any errors she may make in performing her tasks. As a consequence, it is difficult to obtain accurate and reliable data regarding the usual service furnished by the operator. Obviously, such conditions hinder a primary objective of the service observing and are therefore undesirable.

In view of the foregoing, a general object of this invention is to make it possible to obtain reliable data which permits an accurate evaluation of the service furnished by an operator at a switchboard.

A main object is to eliminate from such an evaluation the data which is influenced by an operator's awareness that data is being gathered regarding the quality of her service.

Another object is to minimize the impedance unbalances that are caused in observed circuits due to the bridged capacitance of service observing cable conductors.

These and other objects are attained in accordance with an exemplary embodiment of the invention wherein equipment is provided at a switchboard in a telephone system for preventing an operator from recognizing when her service is being observed, and for minimizing the transmission losses over operator cord circuits that are caused by the bridged capacitance of long observing conductors. This equipment includes a connector circuit which is permanently connected over short conductors to operator cord circuits at the switchboard. The connector circuit is arranged for connecting the observing conductors from remotely located service observing equipment through an isolation circuit to the talking path conductors of a selected one of the operator cord circuits only after the talking path conductors have been connected by the operator to a telephone line. The established connections between the observed talking path conductors and observing conductors are maintained while the observed conductors are connected to telephone lines, and are disengaged when the latter conductors are disconnected from the telephone lines.

This arrangement prevents noise signals, which are caused by the bridged capacitance of the long conductors, from being coupled to the talking path conductors when the observed circuit is not in use for serving a telephone call. Therefore, if the operator connects her telephone set to these talking path conductors when they are not connected to a telephone line, she will not hear noise signals which heretofore allowed her to identify when her service was under observation. After the observed conductors have been connected to a telephone line, it is extremely difficult for the operator to recognize whether noise signals, which may be present on the talking path conductors, are coupled from the line or are caused by the service observing facilities.

The isolation circuit provided by this invention is also located at the switchboard. It comprises an electrical coupling network which minimizes impedance unbalances on the observed talking path conductors and prevents the bridged capacitance of the observing conductors from seriously impairing the voice frequency transmission and direct current signaling over the observed conductors.

A feature of my invention is that the connection of observing conductors from service observing equipment to conductors used at an operator position for rendering service over a communication line be established by equipment which is located at the operator position and which delays the connection until after the position conductors have been connected to that line.

Another feature is that the equipment at the operator position is arranged to disconnect the service observing conductors from the operator position conductors when the latter conductors are disconnected from the communication line.

Another feature is that the equipment at the operator position includes an isolation circuit which comprises an electrical coupling network that is connectable between the position conductors and the observing conductors, and apparatus for connecting the observing conductors to the network after the position conductors have been connected to a communication line and to the network.

Another feature is that the electrical coupling network includes a circuit arrangement which has a high impedance termination that is connectable to the position conductors and a relatively low impedance termination that is connectable to the observing conductors for minimizing the transmission losses over the position conductors that are due to the bridge capacitance of the observing conductors.

A further feature is that the electrical coupling network includes a transformer having a high impedance winding connectable to the position conductors and a relatively low impedance winding connectable to the observing conductors for coupling alternating current signals between the observed position conductors and service observing equipment.

Still another feature is that the electrical coupling network includes apparatus for conducting direct current signals from the position conductors to the observing conductors.

Another feature is the provision of such equipment in a communication system having a switchboard comprising a plurality of cord circuits each having link conductors for interconnecting communication lines, and wherein the equipment includes circuitry which is located partially at the switchboard and partially in the observing equipment for preparing the link conductors of a selected one of the cord circuits for connection to the service observing conductors.

An advantage of this invention is that service observing data can be obtained secretly. Such secrecy is desirable because it prevents anxiety from being aroused in an operator due to her awareness that she is being observed. Another advantage is that the provided electrical network effectively isolates the observed conductors from the observing conductors and thereby allows higher values of bridged capacitance to be tolerated by the observed conductors without seriously impairing transmission. The result of the latter is that longer service observing cables can be used.

The foregoing objects, features and advantages of this invention, as well as others, will be more apparent from a reading of the subsequent description of an exemplary embodiment thereof shown in the drawing. Referring now to the drawing.

Figure 1:
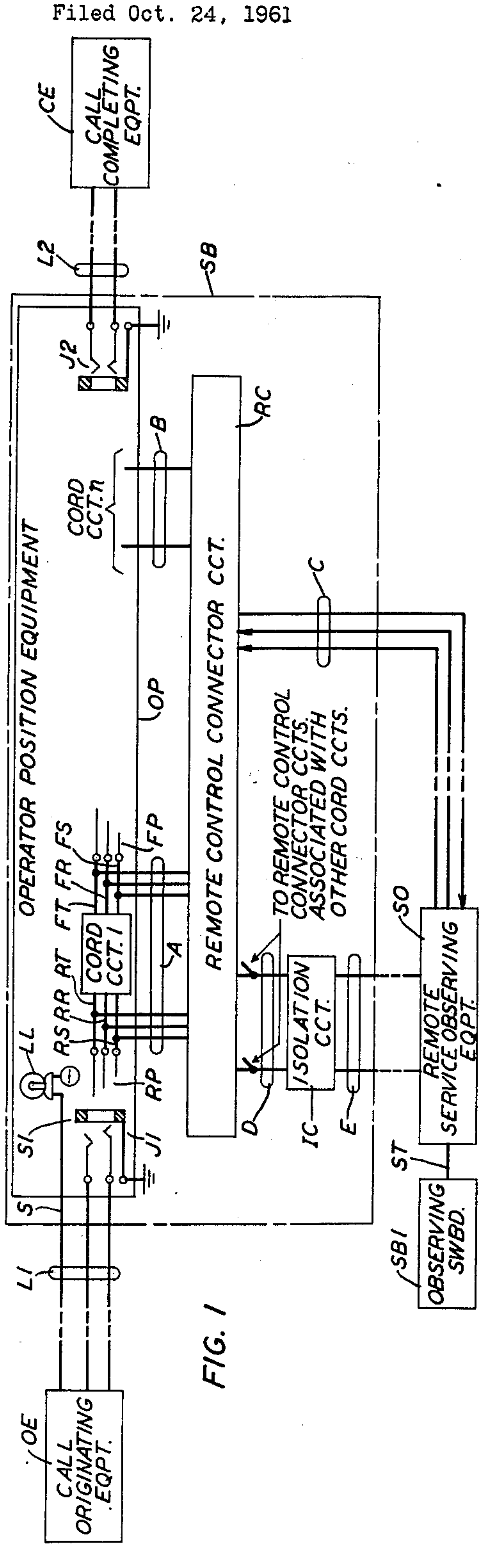
FIG. 1 is essentially a block diagram of an arrangement for enabling an observer at a remote location to observe the service furnished by an operator over cord circuits at a switchboard.

The invention is shown herein as embodied in a service observing arrangement for cord circuits of a toll telephone system. It is particularly concerned with the apparatus in the remote control connector circuit of FIG. 2 and the isolation circuit of FIG. 3. The other circuit equipments, such as the operator position equipment, remote service observing equipment and service observing switchboard, are neither shown nor described in detail herein except where necessary for a complete understanding of the invention. For the purpose of illustration, it is intended that this latter equipment correspond to the equipment disclosed in V. E. Rosene Patent 2,709,722 issued May 31, 1945. Reference may be made to that patent for a complete understanding of the construction of that equipment and of its operation.

The interrelation and functions of the equipment units of the exemplary embodiment will now be described with reference to FIG. 1 wherein a plurality of toll cord circuits 1–*n* are depicted as part of the operator position equipment OP at the toll switchboard SB. Each of these cord circuits, such as the cord circuit 1, comprises a plurality of conductors, such as the tip, ring and sleeve conductors RT, RR, RS, FT, FR and FS, which are terminated at plugs, such as the plugs RP and FP. Plugs, such as plug RP, are called rear plugs and are used by the toll operator for answering telephone calls extended to incoming telephone lines, such as the line L1. Plugs, such as plug FP, are called front plugs and are used by the toll operator for establishing connections to outgoing telephone lines, such as the line L2. The tip and ring conductors of the cord circuits are utilized in the conventional manner for voice communication between customers and between the toll operator and customers. These conductors are also utilized for dialing and key pulse signaling. Supervisory signaling is conducted in the usual way over the sleeve conductors of the cord circuits.

For service observing purposes, the tip, ring and sleeve conductors terminated at the front and rear plugs are permanently connected over cables, such as the cables A and B, to the remote control connector circuit RC which is located at the switchboard SB. When it is desired to have an observer at the observing switchboard SB1 determine the quality of service furnished by the toll operator at the switchboard SB, the remotely located service observing equipment SO is conditioned to select one of the cord circuits 1–*n* for service observation. After the selection is made, a signal is sent from the equipment SO over cable C to operate apparatus in the circuit RC which connects the sleeve conductors, such as conductors RS and FS, of the observed cord circuit over cable C to the equipment SO. No further operations occur in the service observing circuits until after the rear plug of the observed cord circuit is inserted by the toll operator into an incoming line jack, such as the jack J1, to answer an incoming call.

The conductors which are now connected to the tip and ring conductors associated with the front and rear plugs of the cord circuits 1–*n* are short in length. As a result, an insignificant amount of bridged capacitance is added to these conductors and any noise signals, which may be present thereon due to this capacitance, are at essentially the same low level. Therefore, the toll operator may manipulate keys (not shown) at her position for selectively connecting her telephone set (not shown) to these tip and ring conductors during the period when they are not used for serving calls; however, she will not hear the high level noise signals which heretofore allowed her to identify the observed cord circuit.

Assume now that a call has been extended from the call originating equipment OE to the switchboard SB over an incoming line such as line L1, and that the toll operator will elect to use the observed cord circuit to serve that call. When a call is present on line L1, a signal is applied to conductor S by the equipment OE to light the line lamp LL and thereby notify the operator that service is requested on line L1. She may then insert the rear plug of the observed cord into the jack J1 and proceed to serve the call. Upon the insertion of the plug, a ground signal is sent over the sleeve S1 of jack J1 through the sleeve conductor associated with the rear plug over a cable to circuit RC, and therefrom over cable C to the equipment SO. The latter equipment detects this "plug-up" ground signal and, if an observer at switchboard SB1 is available for service observation, it sends a signal back over cable C for causing the operation of apparatus in the connector circuit RC and the isolation circuit IC which extends the tip and ring conductors associated with the front and rear plugs of the observed cord over the cables D and E to the equipment SO.

Isolation circuit IC is located at the switchboard SB and is connected to the circuit RC over the short conductors of cable D. The circuit includes an electrical network for coupling the tip and ring conductors connected to the front and rear plugs of the observed cord through the circuit RC and cable D to the equipment SO over the relatively long conductors of cable E. This network determines the voice frequency response over the service observing conductors of cables D and E, and provides facilities for passing direct current and key pulse signals from the observed cord to the equipment SO. It also minimizes the effects of the capacitance of conductors in cable E upon the tip and ring conductors of the observed circuit. Thus, it also limits the impedance unbalances on the tip and ring conductors and the transmission losses over the voice communication path established by means of these conductors between the line L1 and an outgoing line, such as line L2.

Circuit IC may also serve remote control connector circuits (not shown) associated with cord circuits (not shown) at other switchboard positions. Such connector circuits are connected in multiple to the cable D as is shown in FIG. 1, and can be controlled selectively by the equipment SO over a cable (not shown) which is the equivalent of cable C.

Audible and visual monitoring circuits (not shown) are provided at the observing switchboard SB1 for enabling the observer to follow the progress of calls served by the operator over the observed cord. These circuits are usually in two sets and are controlled by the equipment SO in a manner disclosed in the aforementioned Rosene patent. The first set indicates events occurring on the conductors associated with the rear plug of the observed cord, and the second indicates events occurring in connection with the conductors associated with the front plug of that circuit. By means of these circuits, the observer is able to determine when the toll operator "plugs-up" or "pulls-down" a cord, when either the calling or called customer hangs-up, and also the various supervisory signals (reorder, overflow, etc.) received by the operator while establishing call connections. Facilities are also provided at the switchboard SB1 for permitting the observer to monitor any conversation passed over the tip and ring conductors of the observed cord between the operator and customers, and to follow all dialing operations performed by the operator over these conductors.

After the service observation has been completed, the observer operates a release key (not shown) at the switchboard SB1 and causes the equipment SO to restore the connector circuit RC and the isolation circuit IC to the condition in which it rested before the call was extended to the line L1.

Before describing in detail the various operations of the circuits of the exemplary embodiment of the instant invention, it is advisable to explain the manner in which these circuits may be associated in an operative arrangement with the circuits in the system disclosed in the aforementioned Rosene patent. As is shown in FIGS. 10 and 11 of that patent and described in its specification beginning at line 43 of column 6, the tip, ring and sleeve conductors connected with the front and rear plugs 1001 and 1005 in the cord circuit of FIG. 10 are connected by means of the conductors in the patch cord 1100 of FIG. 11 to the jack 1102 of the cord service observing circuit of FIG. 11. The latter circuit is usually located at a considerable distance from the observed cord circuit and, as a result, the conductors of the cord 1100 are quite long. Such long conductors cause the undesirable effects discussed hereinbefore.

Figure 2:
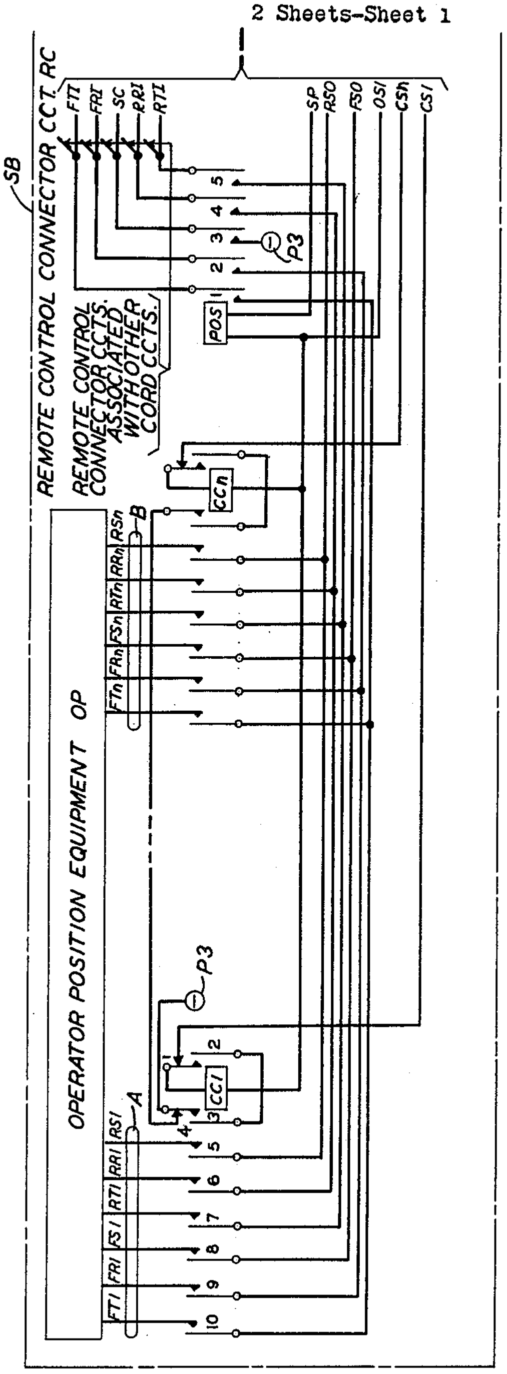
FIG. 2 shows schematically a remote control connector circuit associated with the cord circuits at the switchboard.
Figure 3:
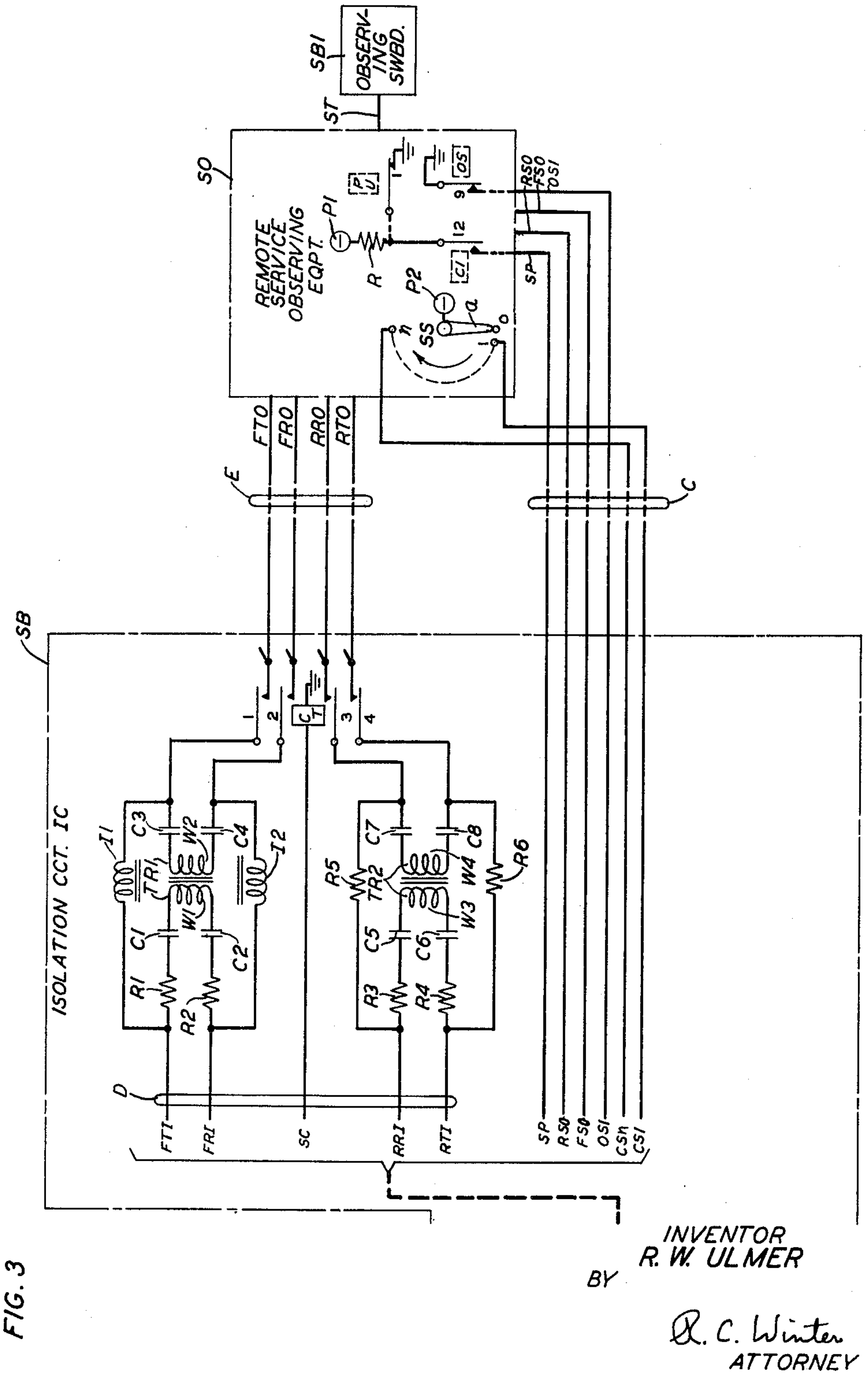
FIG. 3 shows an isolation circuit for cooperating with the remote control connector circuit to connect the cord circuits to remotely located service observing equipment and a service observing switchboard.

According to this embodiment of the present invention, the patch cord 1100 is replaced by the remote control connector circuit RC and the isolation circuit IC as shown in more detail in FIGS. 2 and 3. These circuits are located at the switchboard SB. The tip, ring and sleeve conductors connected to the front and rear plugs of the cord circuits 1–*n* of FIG. 1 are permanently wired over relatively short conductors of cables, such as cables A and B, to the contacts of the cord connector relays CC1–CC*n* in the connector circuit RC of FIG. 2 and are not extended beyond circuit RC until a service observation is made as described hereinafter.

Connector circuit RC is associated with a cord service observing circuit (not shown) in the observing equipment SO of FIG. 3 and with the isolation circuit IC over the conductors of cables C and D respectively. The cord service observing circuit (not shown) in the equipment SO is essentially the same as the corresponding circuit shown in FIG. 11 of the Rosene patent. The conductors FSO and RSO of cable C are connected to the conductors 1116 and 1104 associated with the inputs to the plug-up detector in the Rosene cord service observing circuit (not shown). The conductors SP, OS1 and CS1–CS*n* are parts of new control paths and are not shown in the Rosene patent. As is shown in FIG. 3 of this application, conductor SP is connected to negative potential P1 through a resistor R and a new contact 12 on the relay C1 (shown in FIG. 11 of the Rosene patent). Resistor R is also operatively associated with the contact 1 of relay PU shown on FIG. 11 of the Rosene patent.

Conductor OS1 is connected to ground potential through a new contact 9 of the out-of-service relay OS (shown in FIG. 22 of the Rosene patent). The cord select conductors CS1–*n* are associated with the rotary selector switch SS which is not shown in the Rosene patent.

Service observing conductors FTO, FRO, RTO and RRO of cable E in FIG. 3 extend from contacts on the cut-through relay CT in the isolation circuit IC to those conductors of the Rosene cord service observing circuit which are connected to terminals 7, 8, 14, and 15, respectively, of the jack 1102 of FIG. 11 in the Rosene patent.

The circuit operations involved in preparing the observing equipment SO and the connector circuit RC for observing the service on one of the cord circuits 1–*n* of FIG. 1 will now be described by reference for FIGS. 1, 2 and 3. For the purpose of simplifying the understanding of these operations, the description will be presented by assuming that service observations are to be made on the cord circuit 1. The latter circuit is selected for observation by positioning the arm *a* of the selector switch SS in the equipment SO of FIG. 3 to the switch terminal 1. This connects the negative potential P2 to the conductor CS1 and thereby partially completes a circuit for operating the cord connector relay CC1 of FIG. 2.

When the equipment SO is available for service observing, ground potential is connected through the break contact 9 of relay OS over conductor OS1 to complete the operate circuit for relay CC1. This circuit extends from ground over conductor OS1 through the winding of relay CC1, its contact 1 and conductor CS1 to potential P2. Upon operating, relay CC1 closes a locking path for itself through its contacts 2 and 3 to the negative potential P3, and thereafter remains operated under control of the potential on conductor CS1. The latter potential is removed from conductor OS1 when a service observation on the cord circuit 1 is terminated.

Upon the operation of relay CC1, the conductors RT1, RR1, FT1 and FR1 associated with the plugs RP and FP of FIG. 1 are connected through contacts 6, 7, 9 and 10 of relay CC1 to contacts 1, 2, 4 and 5 of the unoperated position relay POS. At the same time, the conductors RS1 and FS1 are connected through the contacts 5 and 8 of relay CC1 over conductors RSO and FSO of cable C to the equipment SO. The operated relay CC1 also opens, at its contact 4, the locking paths for the other cord connector relays, such as relay CC*n*, in the connector circuit RC. Equipment SO and circuit RC are now prepared to observe the service given over cord circuit 1.

It is noted that the operator at switchboard SB may connect her telephone set (not shown) in a manner disclosed in the Rosene patent, to the tip and ring conductors of each of the cord circuits 1–*n* during the period when they are not used for serving calls in an effort to detect high level noise signals which would be present on the tip and ring conductors of the observed cord circuit 1 if long observing conductors, such as those of the patch cord 1100 of FIG. 11 in the Rosene patent, were connected to the tip and ring conductors of the observed cord circuit. Such noise signals are not present on any of the cord circuits 1–*n*, however, because of the relatively short observing conductors connected between the tip and ring conductors of those circuits and the relays CC1–CC*n*. Hence, the operator is unable to recognize that one of the cord circuits at her position is prepared for service observation. As a result, representative data can be gathered from the service observations, and it is not influenced by the operator's awareness of the observation.

Assume now that an incoming call has been extended to the line L1 of FIG. 1 from call originating equipment OE, that the operator has been informed of the calling condition as previously explained, and that she will serve the call using the cord circuit 1. When the plug RP is inserted into jack J1, ground potential is connected over the sleeves S1 of the jack and plug through conductor RS, contact 5 of relay CC1, and conductors RS1 and RSO to the equipment SO. The latter equipment includes, as previously stated, a plug-up detector (not shown) which, as is fully described in the Rosene patent, detects the ground potential extended to conductor RSO and operates apparatus including the relay C1 in equipment SO for establishing connections between the isolation circuit IC and observing switchboard SB1 over the cable E and the service observing trunk ST. The observer at the switchboard SB1 is notified, in a manner described in the Rosene patent, to prepare for recording the service observing data to be displayed by the lamps (not shown) at the switchboard SB1.

When relay C1 is operated, its contact 12 of FIG. 3 is actuated to complete the circuit for operating relay POS of FIG. 2. This circuit extends from the negative potential P1 through contact 12 of relay C1, conductor SP and the winding of relay POS to the ground potential on the conductor OS1. Upon operating, relay POS actuates its contacts 1 to 5 to connect the conductors FTI, FRI, RTI and RRI from the isolation circuit IC to the front and rear plugs RP and FP, and to close the circuit for operating the relay CT in the isolation circuit IC. This operate circuit extends from ground potential through the winding of relay CT, conductor SC and contact 3 of relay POS to potential P3. The operation of relay CT closes its contacts 1 to 4 and thereby completes a communication circuit from the front and rear plugs RP and FP through the conductors RT1, RR1, FT1 and FR1; contacts 6, 7, 9, and 10 of relay CC1; contacts 1, 2, 4 and 5 of relay POS; conductors RTI, RRI, FTI and FRI; the impedance network in the isolation circuit IC; contacts 1 to 4 of relay CT; observing conductors RTO, RRO, FTO and FRO; apparatus (not shown) in the equipment SO; and the trunk ST to the switchboard SB1.

The impedance network in the isolation circuit IC is used to minimize the capacitance effects of the long conductors of cable E on the communication channel established, as hereinafter explained, by means of the observed cord circuit between an incoming line, such as line L1, and an outgoing line, such as line L2. This network includes the transformer TR1 which has a high impedance winding W1 connected through the capacitors C1 and C2 and the resistors R1 and R2 to the conductors FTI and FRI extending to the observed front plug, and a relatively low impedance winding W2 connected through the capacitors C3 and C4 to the contacts 1 and 2 of relay CT. Transformer TR2 is also included in this network. It has a high impedance winding W3 connected through the capacitors C5 and C6 and the resistors R3 and R4 to the conductors RTI and RRI extending to the observed rear plug, and a relatively low impedance winding W4 connected through the capacitors C7 and C8 to the contacts 3 and 4 of relay CT. Capacitors C1, C2, C5 and C6 are used to prevent the D.-C. resistance of the windings W1 and W3 from bridging the tip and ring conductors of the observed cord circuit. Capacitors C3, C4, C7 and C8 prevent the D.-C. resistance of the windings W2 and W4 from bridging the tip and ring conductors of the equipment SO. The values of the capacitors C1–C7 and resistors R1–R4 together with the electrical properties of the transformers TR1 and TR2 are selected to obtain the desired frequency response characteristic over the communication circuit between the observed cord circuit and the switchboard SB1, and to fix the impedance bridging the tip and ring conductors of the observed cord circuit. In determining this characteristic, it is also necessary to consider the capacitance of the conductors of cable E.

The impedance network in circuit IC may also include the inductors I1 and I2 and the resistors R5 and R6. These inductors are provided when direct current (D.-C.) and multifrequency (MF) key pulsing over the front end of the observed cord circuit are monitored by the equipment SO during service observations. Such key pulsing is used to transmit information, such as the called party designation, over an outgoing line, such as line L2, to the call completing equipment CE. Each of the inductors I1 and I2 has a relatively low D.-C. resistance so that D.-C. key pulses are readily transmitted from the observed cord circuit through these inductors to the equipment SO without appreciable attenuation. The impedance of these inductors is quite high so that MF key pulses are transmitted to the equipment SO in the circuit path through the transformer TR1. When multifrequency and dial pulsing (periodic loop closures) over the front end of the observed cord circuit are monitored instead of the key pulsing, resistors (not shown) of higher resistance values than those of the inductors I1 and I2 can be used for reasons of economy in place of the inductors I1 and I2 to transmit the pulse signals to the equipment SO. Resistors R5 and R6 are bridged around the transformer TR2 for transmitting direct current supervisory signals, such as calling party disconnect signals, from the rear end of the cord circuit to the equipment SO.

After the communication circuit between the front and rear plugs RP and FP and the switchboard SB1 is completed, as previously described, the operator using the cord circuit 1 will orally request from the caller the designation of the called customer. When the designation is received, the operator will insert the front plug FP into the jack, such as jack J2, associated with an outgoing line, such as line L2, and thereafter proceed to serve the call in the usual manner. While she is serving the call, the equipment SO operates, in the same manner as is described in the aforementioned Rosene patent, to observe the service given by that operator and to gather service observing data which is displayed by lamps (not shown) at the switchboard SB1.

When the service observation has been completed, the observer operates a release key (not shown) at the switchboard SB1 which, as described in the Rosene patent, causes the release of relay C1. The release of this relay opens, at its contact 12, the operate circuit for the position relay POS and causes it to release and in turn to open the operate circuit for relay CT of FIG. 2 at its contact 3. The circuits are thus returned to the condition in which they rested prior to the receipt of the incoming call on line L1.

If the operator removes the front and rear plugs of the observed cord from the jacks associated with the incoming and outgoing lines before the observer operates the aforementioned release key (not shown), the plug-up detector circuit (not shown) in the equipment SO will operate, as disclosed in the Rosene patent, and close the contact 1 of the relay PU to connect ground potential to lead SP for effecting the release of the position relay POS of FIG. 2. Upon releasing, relay POS opens at its contact 3 the operate circuit for relay CT in circuit IC and causes it to release. When the latter occurs, the tip and ring conductors of the observed cord circuit are disconnected from the conductors of observing cable E.

To insure that the data obtained from the observation is truly representative of the service rendered by the operator, a number of observations are usually made on the cord circuit 1. On each of these observations, connections are established, as explained in the preceding paragraphs, between the observing conductors of cable E and the tip and ring conductors of the observed cord circuit. After sufficient data has been obtained for properly evaluating the operator service, the arm *a* of switch SS of FIG. 3 is set to switch terminal O to open the operate circuit for relay CC1 of FIG. 2. The latter relay then releases and the connector circuit RC is returned to the condition in which it rested prior to the selection of cord circuit 1 for service observation.

While the equipments of this invention have been described with reference to a particular embodiment in a service observing arrangement for cord circuits used in a toll telephone system, it is to be understood that such an embodiment is intended to be illustrative of the principles of the invention and that numerous other embodiments may be derived by those skilled in the art without departing from the spirit and scope of my invention. For example, the invention can be used advantageously in conjunction with a switchboard which forms a part of a local telephone office, data communication system or a telegraph system. It can be utilized also with cordless type switchboards. In addition, the invention is suitable for use with switchboards which include single ended cord or cordless type facilities for serving only incoming calls. Switchboards of the latter type are used, for example, for providing directory information and other special services.

What is claimed is:

1. In combination, a plurality of communication lines, a switchboard including operator position equipment having conductors for interconnecting said lines, service observing equipment located at a point remote from said switchboard, service observing conductors including a signaling conductor extending between said switchboard and said equipment, means in said equipment responsive to the connection of said position conductors to one of said lines for applying a signal to said signaling conductor, means at said switchboard responsive to said signal for interconnecting said position conductors and said observing conductors, and means responsive to the disconnection of said position conductors from said one line for disconnecting said position conductors from said observing conductors.

2. The combination in accordance with claim 1 wherein said interconnecting means comprises an electromagnetic switching circuit.

3. In a communication system, a plurality of communication lines, an operator position having conductors for interconnecting said lines, service observing equipment remote from said position and comprising means for detecting the connection of said conductors to one of said lines, an isolation circuit, means at said position activated by said detecting means for connecting said conductors to said circuit, service observing conductors extending between said equipment and said circuit, and means in said circuit for establishing an electrical circuit path between said position and observing conductors.

4. In a communication system in accordance with claim 3 the combination wherein said isolation circuit comprises an electrical network having a transformer having a high impedance winding associable with said position conductors and a relatively low impedance winding associable with said observing conductors.

5. In a communication system in accordance with claim 4 the combination wherein said electrical network further comprises means for conducting direct current from said position conductors to said observing conductors.

6. In a communication system in accordance with claim 4 the combination wherein said electrical network further comprises capacitive means for coupling said position conductors to said high impedance winding, and other capacitive means for coupling said low impedance winding to said observing conductors.

7. In a communication system in accordance with claim 6 the combination wherein said electrical network includes resistance means connectable in circuit with said capacitive means and said high impedance winding.

8. In a communication system, a plurality of two-wire communication lines, an operator position having first and second position conductors for interconnecting said lines, an isolation circuit, means responsive to the connection of said conductors to one of said lines for connecting said conductors to said circuit, service observing equipment remote from said position, first and second service observing conductors connecting said equipment to said circuit, and an electrical network in said isolation circuit for establishing an electrical circuit path between said position conductors and said equipment via said observing conductors and comprising a transformer having high and low impedance windings each having a first and a second terminal, a capacitor for coupling said first position conductor to said first terminal of said high impedance winding, a capacitor for coupling said second position conductor to said second terminal of said high impedance winding, a capacitor connected between said first observing conductor and said first terminal of said low impedance winding, a capacitor connected between said second obzserving conductor and said second terminal of said low impedance winding and means for conducting direct current from said position conductors to said observing conductors.

9. In a communication system in accordance with claim 8 the combination wherein said electrical network comprises a resistor serially connected from said first position conductor to said coupling capacitor connected to said first terminal of said high impedance winding and a resistor serially connected from said second position conductor to said coupling capacitor connected to said second terminal of said high impedance winding.

10. In a communication system in accordance with claim 9 the combination wherein said electrical network further comprises means for conducting direct current from said first position conductor to said first observing conductor and from said second position conductor to said second observing conductor.

11. In a communication system in accordance with claim 10 the combination wherein said conducting means comprises inductance means.

12. In a communication system in accordance with claim 10 the combination wherein said conducting means comprises resistor means.

13. In a telephone system, a plurality of telephone lines, a switchboard including a plurality of cord circuits for interconnecting said lines, an isolation circuit at said switchboard, means for preparing one of said cord circuits for connection to said isolation circuit, means responsive to the connection of said prepared cord circuit to any one of said lines for connecting said prepared cord circuit to said isolation circuit, service observing equipment located at a point remote from said switchboard, and means in said isolation circuit responsive to the connection of said prepared cord circuit to said isolation circuit for interconnecting said prepared cord circuit and said observing equipment.

14. In a telephone system, a plurality of telephone lines, a switchboard having a plurality of cord circuits, each of said cord circuits having a supervisory conductor and link conductors connectable to said lines, service observing equipment located remote from said switchboard, means at said switchboard for preparing said link conductors for connection to said observing equipment, means in said observing equipment for activating said preparing means to connect the supervisory conductor of a selected one of said cord circuits to said observing equipment, means controlled by the connection of the link conductors of said selected cord circuit to one of said lines for applying an electrical condition to said selected supervisory conductor, service observing conductors extending between said equipment and said position connector means at said position, and means in said observing equipment responsive to said electrical condition on said supervisory conductor for activating said connector means to connect said link conductors of said selected cord circuit to said observing conductors.

15. In a telephone system, a plurality of incoming and outgoing telephone lines, a switchboard having a plurality of cord circuits, each of said cord circuits having a supervisory conductor, incoming conductors connectable to said incoming lines and outgoing conductors connectable to said outgoing lines, an isolation circuit, service observing equipment remote from said switchboard, means in said observing equipment for selecting a cord circuit for observation, means at said switchboard for connecting the supervisory conductor of said selected cord circuit to said observing equipment in response to a control signal from said observing equipment, means controlled by the connection of the incoming conductors of said selected cord circuit to one of said incoming lines for applying an electrical condition to said selected supervisory conductor, said switchboard means further comprising means for connecting said selected cord circuit to said isolation circuit, means in said observing equipment responsive to said electrical condition on said selected supervisory conductor for enabling said connecting means to connect said selected cord circuit to said isolation circuit, and means in said isolation circuit controlled by said connecting means for interconnecting said observing equipment and said incoming and outgoing link conductors of said selected cord circuit.

16. In a telephone system in accordance with claim 15 the combination wherein said interconnecting means include incoming link conductors and outgoing link conductors extending between said observing equipment and said isolation circuit; and wherein said isolation circuit comprises an electrical coupling network having a high impedance termination connectable to said selected incoming conductors and a relatively low impedance termination connectable to said incoming link conductors, and an additional electrical coupling network having a high impedance termination connectable to said selected outgoing conductors and a relatively low impedance termination connectable to said outgoing link conductors.

References Cited in the file of this patent

UNITED STATES PATENTS

| | | |
|---|---|---|
| 1,564,357 | Kendall | Dec. 8, 1925 |
| 1,691,554 | Saville | Nov. 13, 1928 |
| 1,907,240 | Brooks et al. | May 2, 1933 |
| 1,996,213 | Phelps | Apr. 2, 1935 |
| 2,485,748 | Kucera | Oct. 25, 1949 |
| 2,709,722 | Rosene | May 31, 1955 |
| 2,875,286 | Blashfield | Feb. 24, 1959 |